United States Patent
Schneider

(10) Patent No.: US 6,356,229 B1
(45) Date of Patent: Mar. 12, 2002

(54) METHOD FOR PROCESSING RADAR SIGNALS

(75) Inventor: Robert Schneider, Burgrieden (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 09/554,814

(22) PCT Filed: Nov. 12, 1998

(86) PCT No.: PCT/DE98/03315

§ 371 Date: Jul. 12, 2000

§ 102(e) Date: Jul. 12, 2000

(87) PCT Pub. No.: WO99/26082

PCT Pub. Date: May 27, 1999

(30) Foreign Application Priority Data

Nov. 18, 1997 (DE) ......................................... 197 51 004

(51) Int. Cl.⁷ ............................................... G01S 13/93
(52) U.S. Cl. ........................... 342/70; 342/195; 342/90
(58) Field of Search ............................. 342/70, 71, 72, 342/90, 195

(56) References Cited

U.S. PATENT DOCUMENTS

| | | | | |
|---|---|---|---|---|
| 4,074,264 A | * | 2/1978 | Wilmot | 342/90 |
| 4,439,765 A | * | 3/1984 | Wilmot | 342/58 |
| 4,845,500 A | * | 7/1989 | Cornett et al. | 342/90 |
| 5,063,524 A | * | 11/1991 | Ferre et al. | 382/107 |
| 5,311,188 A | * | 5/1994 | Meijer et al. | 342/90 |
| 5,495,254 A | | 2/1996 | Uemura et al. | 342/174 |
| 5,572,428 A | | 11/1996 | Ishida et al. | 364/461 |
| 5,629,851 A | | 5/1997 | Williams et al. | 364/426.044 |
| 5,670,963 A | | 9/1997 | Kubota et al. | 342/70 |
| 6,121,919 A | * | 9/2000 | Ameen et al. | 342/174 |
| 6,215,983 B1 | * | 4/2001 | Dogan et al. | 455/63 |
| 6,278,401 B1 | * | 8/2001 | Wigren | 342/195 |
| 6,292,136 B1 | * | 9/2001 | Egnell | 342/432 |

FOREIGN PATENT DOCUMENTS

| | | |
|---|---|---|
| DE | 196 10 351 | 9/1996 |
| DE | 196 54 538 | 7/1997 |

* cited by examiner

Primary Examiner—John B. Sotomayor
(74) Attorney, Agent, or Firm—Kenyon & Kenyon

(57) ABSTRACT

A method for procession radar signals for a radar arrangement which is moving in relation to its environment, in particular a road vehicle radar due method include analyzing a plurality of object traces formed by objects to be detected, to determining a current moving direction, and, in response to a deviation of this moving direction from the alignment of the radar arrangement, correcting the object angle determined when detecting the objects within the scope of the angular resolution of the radar arrangement on the basis of the determined deviation, and relating it to the moving direction.

9 Claims, 1 Drawing Sheet

METHOD FOR PROCESSING RADAR SIGNALS

FIELD OF THE INVENTION

The present invention relates to a method for processing radar signals, particularly in the case of a radar arrangement, which is moving in relation to its environment.

RELATED TECHNOLOGY

Radar arrangements, which are moving in relation to their surroundings, are, for example, vehicle radar arrangements, in particular those used in road vehicles. In this context, the radar arrangements typically monitor a spatial area situated in the principal driving direction, and detect reflecting objects located in this area, in accordance with the distance and angle with respect to the radar arrangement. As a rule, it is assumed that the reference axis alignment of the radar arrangement, used as a reference for the angles of incidence of radar echoes, is parallel to the principal moving direction of the vehicle carrying the system. Normally, the main travel direction is straight-ahead.

In practical applications, however one can only assume that the radar arrangement's reference axis is roughly aligned in parallel to the straight-ahead direction. An exact alignment entails considerable complexity and requires special devices and knowledge. Moreover, mechanical actions can change adjustments after they are made.

As a rule, therefore, the angular deviations of the reflecting objects measured during radar operation are afflicted with a more or less serious angular error, depending on the angular difference of the radar arrangement's alignment relative to the vehicle's principal moving direction. Over and above that, a seriously distorted alignment can mean that a substantial section of the surroundings is no longer included in the radar arrangement's monitoring range.

U.S. Pat. No. 5,495,254 describes a method which makes it possible to detect a horizontal alignment error of a vehicle radar arrangement. In this context, a common center of mass is determined for all locations of the objects picked up by the radar arrangement. By periodically calculating this center of mass, its trace (or trajectory) is produced and used to determine a possible alignment error of the radar arrangement (column 6, line 65–column 7, line 7). This has a negative result in practical applications because the analysis of the center-of-mass trace only provides useful results when the locations of the detected objects with respect to the alignment of the radar arrangement correspond at least approximately to a Gaussian distribution. This requires a multiplicity of reflectors at both street edges in a predefined interval.

SUMMARY OF THE INVENTION

An object of the present invention is, with little outlay, to achieve operational dependability with respect to precisely determining target angles, and to monitor, i.e., to correct the alignment of a radar arrangement.

The present invention provides a method for processing radar signals in the case of a radar arrangement, which is moving in relation to its environment and which receives radar echoes from objects from the environment with an angular resolution. From time sequential object data, object traces (or trajectories) are formed, and, through analysis of a plurality of object traces, a moving direction is determined in relation to the alignment of the radar arrangement.

By ascertaining any existing deviation between the radar arrangement's alignment and the actual moving direction, the present invention makes it possible, on the one hand, to monitor any such, unacceptably large deviation, while producing a warning signal and, on the other hand, to correct measured target angles. In this context, here and in the following, the radar arrangement's alignment denotes a preferred direction of the angularly resolved diagram of a radar antenna, for example the direction of the diagram maximum or the direction of a plane of symmetry of the diagram; and the moving direction denotes the main moving direction of a mount supporting the radar arrangement, in particular a vehicle's straight-ahead direction. Ideally, the alignment and the moving direction coincide or form a defined angle between them.

The present invention starts out from an angular resolution in at least one dimension, an angular resolution in the horizontal (azimuth) being of particular interest in actual applications. When combined with the radar's distance resolution, the result is an at least two-dimensional resolution. Such a two-dimensional resolution can be represented in a planar coordinate grid, which is fixed with respect to the radar arrangement. In response to the relative movement of the radar arrangement and the environment, the objects' positions detected by the radar arrangement shift in the coordinate grid. These shifts can actually be determined by trace-forming algorithms and described by object traces (or trajectories). In the simplest case, the object traces are straight connections between a beginning and an end position within an observation timing window. However, in a more precise description of the relative movement, they can also be curved lines. Without being limited thereto, the present invention is described further in the following, based on the assumed existence of straight object traces. Curved lines can also be represented as straight lines, for example, using linear regression, or as arc chords.

In the case of a road-vehicle radar arrangement, objects detected by the radar arrangement include, in particular, other vehicles, the edge of the street, road markings, crash barriers, obstacles, or also reflective objects located outside of the road surface area of interest. In the representation in the coordinate system, which is fixed with respect to the radar arrangement, the positions of these objects shift on trajectories, to which directions can be assigned in the form of angles with respect to a reference axis, in particular with respect to the alignment of the radar arrangements. By analyzing a plurality of such trajectories, an average principal moving direction between the objects and the radar arrangement can be determined.

The analysis can be performed by statistically evaluating the distribution of the directions (angles) of the detected trajectories, preferably using mean-value generation. Particularly advantageous is a continuous, recursive mean-value generation. The evaluation time for a mean-value generation or other statistical analysis is selected to be long enough, so that even special situations, such as cornering by a road vehicle, do not lead to any significant falsification of the value determined for the moving direction. In the case of an analysis within a fixed timing window, this can be given, for example, by a minimum driving distance or driving time. When new directional values are recursively combined with a previously valid value for the moving direction, the weighting factor for the new values is to be selected to be low enough, preferably less than 1%.

The trajectories of all detected objects can be considered in the analysis. When working with a significant integration time, then even individual, falsifying values, such as the trace of another vehicle driving across an intersection, are of no particular consequence. However, it is also possible to preselect the trajectories or objects to be considered in the analysis. A selection criterion of this kind can be, for example, a deviation in the direction of a trajectory from the radar arrangement's alignment, or the most recently determined moving direction below a maximal value of, for example, 5°. In addition, one can limit the consideration to objects having a minimum relative velocity value, or to objects moving toward the radar arrangement.

The moving direction determined by the analysis of the trajectories shows a more or less pronounced angular deviation with respect to the alignment of the radar arrangement. Merely in the case of an ideally aligned radar arrangement, does this angular deviation become zero.

Once the angular deviation is known, the angles of the detected objects acquired using the angular resolution of the radar arrangement can be simply corrected with respect to the principal moving direction. This leads to a precise angular indication with respect to the principal moving direction. An unacceptably large angular deviation means that a mechanical readjustment is necessary. A warning or alarm signal can be derived from the ascertainment of such an unacceptable angular deviation.

An angular resolution of the radar arrangement can also be given in two dimensions, such as azimuth and elevation. The angular resolution of the radar arrangement can be realized both by a real, as well as by a synthetic aperture.

In a minimal configuration, a division into only two directional segments is assumed, such as in monoplus systems. However, in the azimuth, in particular, the angular resolution is preferably better than 5° and, for each angular segment, preferably better than 2°.

BRIEF DESCRIPTION OF THE DRAWING

The present invention is explained in greater detail with reference to the drawing, in which.

DETAILED DESCRIPTION

Figure 1:
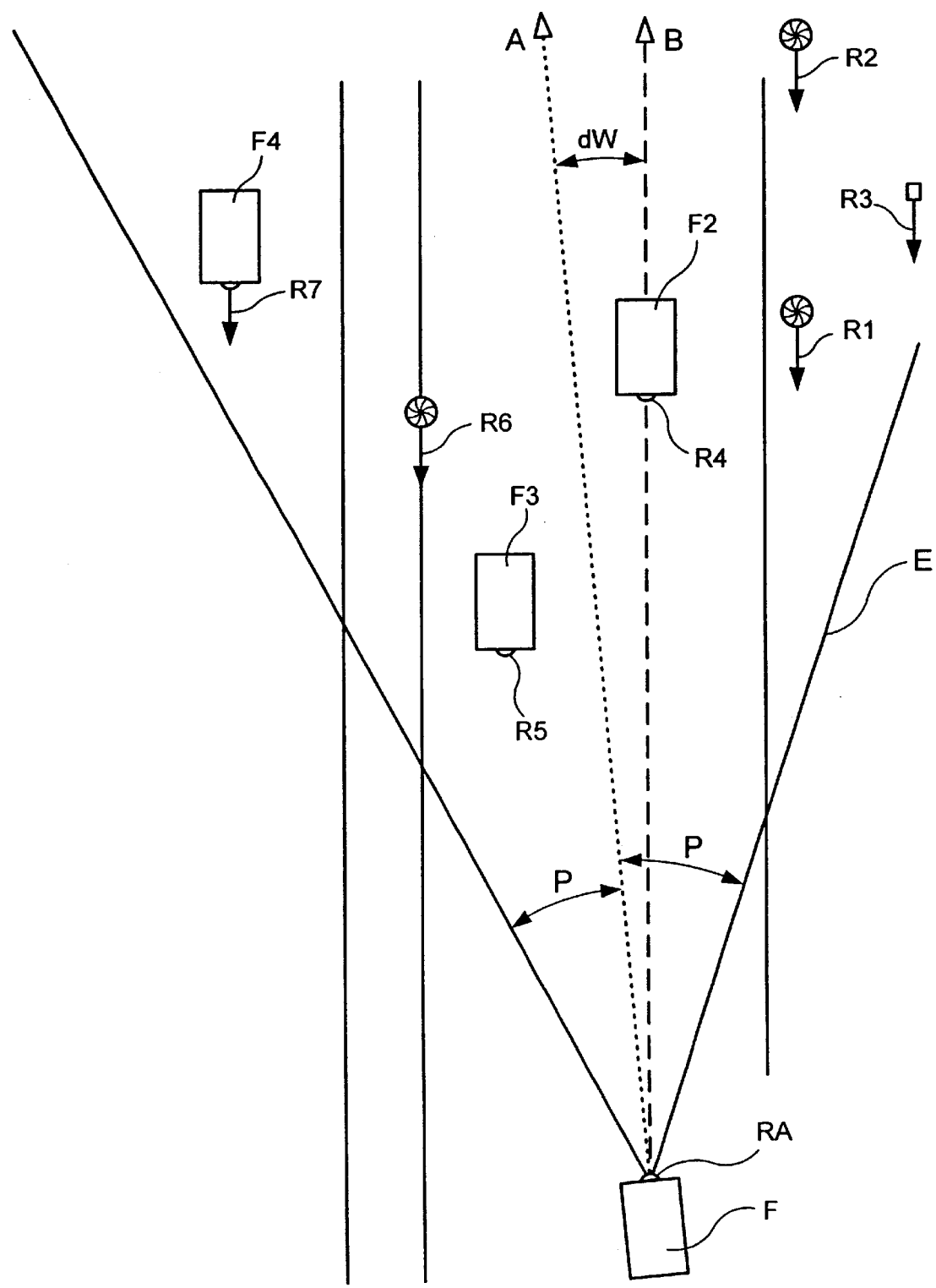
FIG. 1 shows one use of the radar arrangement according to the method of the present invention.

The illustration depicts a traffic situation, where a vehicle F, which, in its front area, carries a radar arrangement RA, is traveling on a straight section of a multi-lane road. The moving direction is denoted by B and plotted as a broken line. The alignment A of the radar arrangement formed, for example, by the main beam direction of an asymmetrical antenna diagram is drawn in as a dotted line and exhibits an angular deviation dW with respect to the moving direction. Let it be assumed here that this angular deviation is a priori unknown. The coverage range E of the antenna diagram extends over an angular range P of, for example, 30° in the horizontal to both sides of alignment A. In coverage range E, a plurality of objects are entered, which, when forming the trace over a predefined timing window, exhibit the plotted trajectories R1 through R7.

Trajectories R1 and R2 can be attributed, for example, to boundary markings on the right street edge, trajectory R6 to a separation marking for the oncoming traffic lane, trajectory R3 to an object not relevant to the traffic and outside of the road area, trajectories R4, R5, R7 to other vehicles.

In the fixed coordinate representation with respect to radar arrangement RA, trajectories of stationary objects form straight sections, which, in conformance with the traveling speed of vehicle F, have approximately the same length and, in the case of alignment A, form essentially the same angle. Therefore, the reflections of stationary objects constitute an especially favorable basis for determining an average moving direction. The analysis of the trajectories can be limited, for example, to the trajectories of such stationary objects. It is assumed that vehicle F2 is driving at a constant distance ahead of vehicle F. Therefore, its position in relation to vehicle F or to radar arrangement RA does not change, and trajectory R4 degenerates to a point. A vehicle F3 driving in the passing lane is driving slightly faster than vehicle F, in the same driving direction. At a slight difference in velocity, assigned trajectory R5 can only be short in length and is, thus, possibly not very reliable in the ascertained direction of this trajectory. Therefore, trajectories of a shorter length could also be excluded from the analysis, or be considered using a lower weighting factor, for example one that is proportional to the trajectory length.

Vehicle F4, approaching in the opposite lane, exhibits a high relative velocity due to travel in the opposite direction, and a trajectory R7 having a clearly greater length in comparison with the other described objects. By generating the mean value from the angles of all of or from selected trajectories with respect to a reference axis in the coordinate system, an average angle of all trajectories can be defined and be assumed as an actual, current moving direction. Given a sufficient number of considered trajectories, this average angle coincides with high precision with actual moving direction B.

As a rule, the trajectories are encumbered by statistical fluctuations due to estimation errors and due to the limited resolution. However, when the analysis is performed, these are compensated on average and, therefore, give no cause for a substantially modified consideration.

The present invention is not limited to the described specific embodiments, but rather can be varied within the framework of the ability of the average person skilled in the art. In particular, the method can be advantageously applied in various other environments, such as rail traffic, inland shipping traffic, airport runways, i.e., generally in all application areas characterized by autonomous traffic. The method can be used for calibration purposes in various angularly resolved positions, in particular azimuth and elevation and, in this context, verify each desired angle between the alignment of the radar arrangement and the moving direction of the mount.

What is claimed is:

1. A method for processing radar signals for a radar arrangement, the radar arrangement moving in relation to an environment and receiving radar echoes from a plurality of objects in the environment having an angular resolution, the method comprising:
    forming a plurality of object traces from time sequential object data, each object trace corresponding to a respective one of the plurality of objects;
    performing an analysis of the plurality of object traces;
    determining a moving direction in relation to an alignment of the radar arrangement from the analysis.

2. The method as recited in claim 1 wherein the performing the analysis includes generating a mean value of trace directions from the plurality of object traces.

3. The method as recited in claim 2 wherein the determining the moving direction is performed so that the mean value is assumed to be the moving direction.

4. The method as recited in claim 2 wherein the generating the mean value is performed recursively.

5. The method as recited in claim 1 wherein the object traces are formed as straight sections.

6. The method as recited in claim 1 wherein the plurality of object traces include a plurality of object traces having trace directions located within a predefinable directional window, and the performing the analysis is carried out by considering only the plurality of object traces having trace directions located within the predefinable directional window.

7. The method as recited in claim 1 further comprising using angles of incidence with respect to the moving direction so that the radar signals are further processed.

8. The method as recited in claim 1 wherein the radar arrangement includes a vehicular radar arrangement.

9. The method as recited in claim 8 wherein the vehicular radar arrangement includes a road vehicle radar arrangement.

* * * * *